J. A. DICKINSON.
EFFICIENCY TESTER.
APPLICATION FILED JULY 6, 1915.

1,187,279.

Patented June 13, 1916.
2 SHEETS—SHEET 1.

WITNESSES:
J. E. Dade.
Alan F. Garner.

INVENTOR
JOHN A. DICKINSON

BY
Munn &co
ATTORNEYS

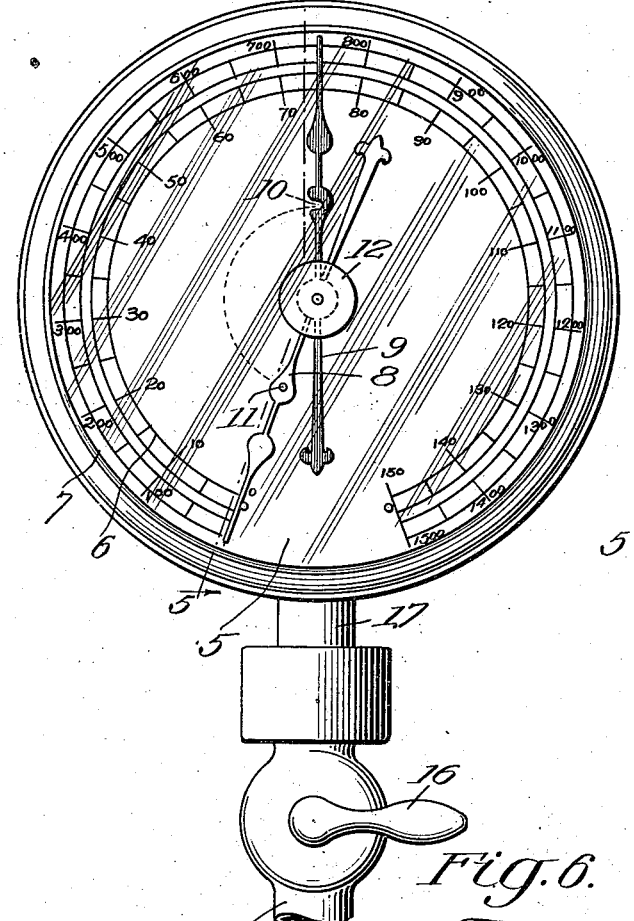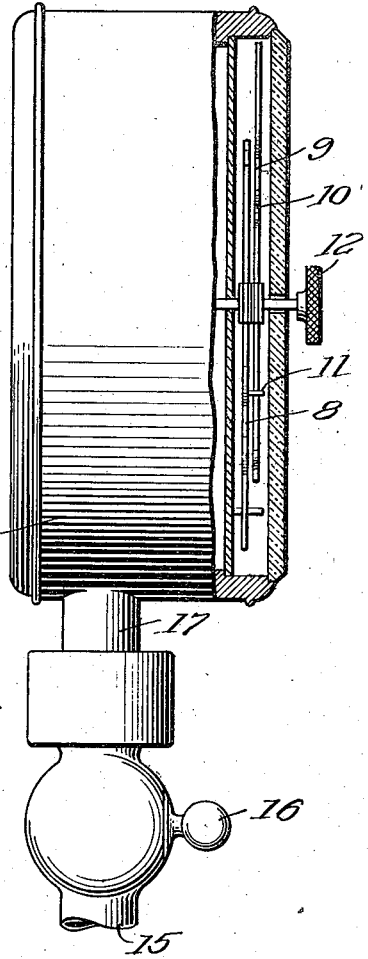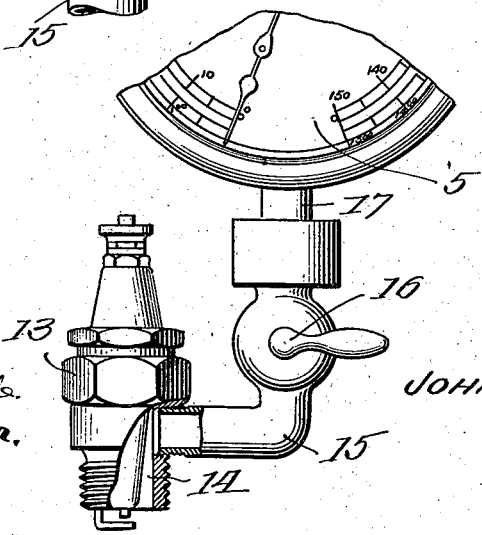

UNITED STATES PATENT OFFICE.

JOHN ALLEN DICKINSON, OF LITTLE ROCK, ARKANSAS.

EFFICIENCY-TESTER.

1,187,279.            Specification of Letters Patent.     Patented June 13, 1916.

Application filed July 6, 1915. Serial No. 38,151.

*To all whom it may concern:*

Be it known that I, JOHN A. DICKINSON, M. E., a citizen of the United States, and a resident of Little Rock, in the county of Pulaski and State of Arkansas, have invented a certain new and useful Improvement in Efficiency-Testers, of which the following is a specification.

One of the principal objects of the invention is to provide an improved means whereby the degree of compression and explosion pressure of an internal combustion engine, may be readily ascertained, in order that the designed compression and explosion pressures being known, the efficiency of the engine may be reckoned and any trouble tending to reduce that efficiency be analyzed and located.

Another object of the invention contemplates the provision of a device of the nature set out in the form of a gage adapted to be connected with the cylinder of a multiple cylinder engine or the cylinder of a single cylinder engine, as the case may be, said gage being adapted to register both the compression and explosion pressures of the cylinders at will and being connected with the cylinders in such manner that communication between the gage and any one desired cylinder may be established when desired.

A further object of the invention is to provide a means whereby the explosion pressure of any one of the cylinders of an internal combustion engine may be accurately ascertained, so that the proper carbureter adjustment necessary to acquire the desired degree of efficiency in the engine may be accurately made.

A still further object of the invention is to provide a device of the class described which will be extremely simple, durable, efficient in operation, and inexpensive to manufacture and maintain.

With these and other objects in view which will become apparent as the description proceeds, the invention resides in the construction, combination, and arrangement of parts hereinafter more fully described and claimed and illustrated in the accompanying drawings in which like characters of reference indicate like parts throughout the several figures, of which—

Figure 1:
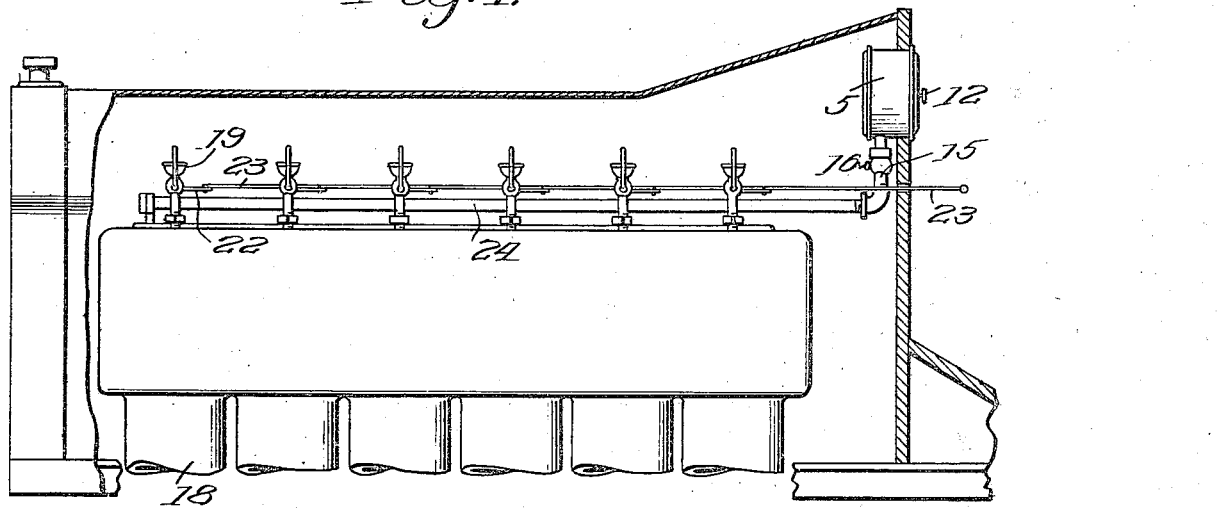
Figure 2:
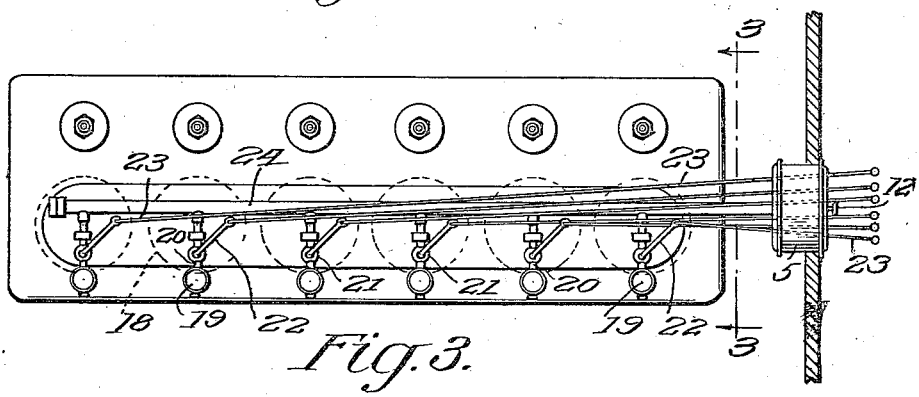
Figure 3:
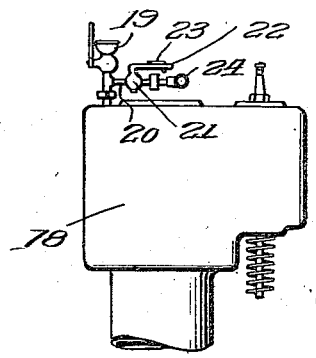

Figure 1 represents a view in side elevation of an automobile engine equipped with my improved efficiency tester. Fig. 2 represents a top plan view thereof. Fig. 3 represents a view looking at the same from the rear end of the engine, the view being taken through the valve operating rods on the plane indicated by the line 3—3 of Fig. 2. Fig. 4 represents a front elevational view of the gage. Fig. 5 represents a side elevational view thereof partly in section. Fig. 6 represents a view in elevation showing a method by which the gage may be connected to the spark plug of an engine cylinder.

In carrying out my invention I provide a pressure gage indicated generally at 5 and having concentric scales 6 and 7 provided on its face. Scale 6 is adapted to be utilized in measuring the compression pressure of the cylinder with which the gage is in communication, and is graduated to register pressures from zero to 150 pounds above atmospheric pressure, while scale 7 is adapted to measure the explosion pressure of the cylinder and is graduated from zero to 1,500 pounds above atmospheric pressure. It will of course be understood that the extent of the graduations of both scales may be varied to suit the conditions to which the gage is to adapt itself. The gage is provided with a hand 8 connected with a mechanism (not shown) whereby the hand may be actuated to register either the compression pressure or the explosion pressure of the cylinder with which the gage is in communication. A friction retained hand 9 is also provided and pivoted concentrically with hand 8 and said hand 9 is provided with a recess at 10 into which a pin 11 carried by hand 8 is adapted to engage when the latter hand is actuated. Thus, if both hands are at zero and hand 8 is actuated to register 60 pounds, the hand 9 will be shifted to the registered mark and upon the return of the hand 8 to zero, when the pressure is released, hand 9 will remain at the mark attained. Thus the maximum pressure of any one of the cylinders may be accurately read. A thumb screw or turn buckle 12 is rigidly connected with hand 9 in such manner that the latter may at will be returned to zero.

In Figs. 4, 5, and 6 a method is shown whereby the gage may be connected with the spark plug of an engine cylinder. 13 indicates the spark plug which latter is provided with a by-pass 14 with which a tube 15 of small bore is set in communication by being turned into a threaded opening in the plug which communicates with the by-pass 14. This tube is provided with a valve adapted to be actuated by the valve lever 16, and a short pipe section 17 connects the valve casing or tube 15 with the pressure gage 5. By shifting the valve into open position communication will be established between the pressure gage and the cylinder in connection with which the spark plug 13 is used, so that the compression pressure or the explosion pressure created within the cylinder may be accurately ascertained.

In Figs. 1, 2, and 3 the application of the efficiency testing device to a six cylinder motor is disclosed. It will of course be understood that the device may be applied to a motor of any number of cylinders desired. 18 represents the engine cylinders to each of which is connected a priming cup 19 in the usual manner. A pipe 20 leads from each priming cup and is provided with a valve at 21 adapted to be operated by a lever 22 for opening or closing communication through pipe 20. The lever 22 is connected with a valve operating or control rod 23 which preferably extends through the dash or instrument board of the machine. Each of the cylinders it will be noted is provided with one of the mechanisms just described, and the various valve operating rods may be numbered if desired so that the operator may know which of the cylinders is being tested as hereinafter set out.

At their outer ends, the pipes 20 communicate with a main or header pipe 24 which communicates with the gage 5. The latter may be placed on the dash or instrument board of the automobile, or in any other desirable and convenient position. Thus by operating any desired one of the valve control rods, a predetermined cylinder may be thrown into communication with the gage so that the compression or the explosion pressure created within the cylinder may be determined.

It will of course be understood that the use of the gage is not limited to its connection with the spark plug or the priming cup of an engine, as any other desirable means by which communication may at will be established between the gage and the desired cylinder may be used.

It is well known to those versed in the art to which this invention pertains, that the efficiency of internal combustion engines may be accurately located by a comparison between the known compression for which the engine is designed, and the compression actually attained in the engine cylinders. It follows therefore that by the use of such a device as I have proposed, the efficiency of each one of the cylinders may be readily ascertained and the engine troubles be readily discovered and corrected. The explosion pressure in each of the cylinders may be accurately registered by the tester, and since as is well known the explosion pressure attained in the cylinder of an internal combustion engine varies with the different degrees of fuel mixture as controlled by the carbureter, it follows that extremely accurate and scientific adjustments of the carbureter for acquiring the highest or the desirable explosion pressure may be made. In this manner the use of my efficiency tester will be of great assistance to motor car operators, particularly amateurs in maintaining their engines at a maximum efficiency. Faults which effect and influence the efficiency and power of the engine, such as leaky piston rings, valves, manifolds, cylinders and leaky joints in cylinder heads or valve caps, incorrect carbureter adjustments, inferior fuel quality and ignition troubles such as defective plugs, weak sparks, leaky wiring, etc., may be accurately located by the use of such an efficiency tester as I provide, and the proper steps taken to remedy the defect.

Although I have described the preferred embodiment of my invention, I may desire to make such changes in the construction, combination and arrangement of parts thereof, as do not depart from the spirit of the invention and the scope of the appended claims.

I claim:—

1. A device of the class described comprising a pressure gage having means whereby the compression pressure and the explosion pressure created within a cylinder may be ascertained, consisting of a header pipe communicating with the pressure gage, communicating means between the header pipe and each of the cylinders of an internal combustion engine, valve means for controlling said communicating means, and rods connected with the valve means and adapted to be individually actuated for throwing any predetermined cylinder into communication with the header pipe.

2. The combination with an internal combustion engine, of a pressure gage, communicating means connecting the pressure gage with the cylinders of the engine, valve means controllable at a distance for controlling the communicating means whereby communication may be established between the pressure gage and any predetermined cylinder, and means provided by the gage for ascertaining the compression or explosion pressure of the cylinder with which the gage is in communication.

3. An efficiency tester for a motor car engine, including a pressure gage adapted to register the compression or the explosion pressure created within a cylinder with which it is in communication, communicating means between the gage and the cylinders of the engine, and means operable from the driver's seat for establishing communication between the gage and any predetermined cylinder.

JNO. ALLEN DICKINSON, M. E.